US008936125B2

(12) United States Patent
Nakamori

(10) Patent No.: US 8,936,125 B2
(45) Date of Patent: Jan. 20, 2015

(54) BATTERY CONTAINER

(71) Applicant: Mitsubishi Jidosha Kogyo Kabushiki Kaisha, Tokyo (JP)

(72) Inventor: Yoji Nakamori, Tokyo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 13/753,692

(22) Filed: Jan. 30, 2013

(65) Prior Publication Data

US 2013/0192914 A1 Aug. 1, 2013

(30) Foreign Application Priority Data

Jan. 31, 2012 (JP) .................................. 2012-017779

(51) Int. Cl.
*H01M 2/10* (2006.01)
*B60K 1/04* (2006.01)

(52) U.S. Cl.
CPC ............... *B60K 1/04* (2013.01); *H01M 2/1077* (2013.01); *H01M 2/1083* (2013.01); *B60K 2001/0438* (2013.01); *B60Y 2306/01* (2013.01)
USPC .......... 180/68.5; 220/646; 220/651; 220/660; 429/98; 429/100

(58) Field of Classification Search
CPC .. B60Y 2306/01; B62D 21/15; B62D 21/155; B62D 21/157; B60L 11/1877; B60L 11/1879; H01M 2/1083; B65D 5/445; B65D 5/448; B65D 7/44; B65D 11/28
USPC .............. 180/68.5; 429/96, 98–100; 224/902, 224/400, 522–533, 538; 220/62.11, 62.18, 220/626, 627, 628, 646–650, 651, 653, 660, 220/732; 219/80, 86.1–94; 296/182.2, 296/184.1, 186.1, 187.01, 187.03
See application file for complete search history.

(56) References Cited

U.S. PATENT DOCUMENTS

| | | | | |
|---|---|---|---|---|
| 70,811 A | * | 11/1867 | Crane | 220/646 |
| 2,144,945 A | * | 1/1939 | Sutton | 220/651 |
| 2,658,253 A | * | 11/1953 | Richardson | 27/35 |

(Continued)

FOREIGN PATENT DOCUMENTS

| EP | 2 072 308 A2 | 6/2009 |
|---|---|---|
| JP | 2010-284984 A | 12/2010 |

OTHER PUBLICATIONS

American Welding Society, Welding Journal No. 90, 32a-40a, Feb. 2011: Three-Sheet Spot Welding of Advanced High-Strength Steels.*

(Continued)

*Primary Examiner* — J. Allen Shriver, II
*Assistant Examiner* — Steve Clemmons
(74) *Attorney, Agent, or Firm* — Birch, Stewart, Kolasch & Birch, LLP

(57) ABSTRACT

A battery container which is to house a battery for a vehicle and which is to be attached between at least two frames disposed in the vehicle, includes: a bottom plate; a wall member which is raised from a circumference of the bottom plate and which includes a side wall member disposed along the frames; an outer frame which is attached to an outer side of the side wall member; and an inner frame which is attached to an inner side of the side wall member. The outer frame and the inner frame are extended in a substantially same direction along the side wall member, and the side wall member is clampingly held between the outer frame and the inner frame.

6 Claims, 8 Drawing Sheets

(56) References Cited

U.S. PATENT DOCUMENTS

| | | | | |
|---|---|---|---|---|
| 2,801,024 | A | * | 7/1957 | Osborne ................ 220/62.12 |
| 3,780,903 | A | * | 12/1973 | Clarkin et al. ............. 220/646 |
| 3,798,407 | A | * | 3/1974 | Becker ....................... 219/92 |
| 5,558,949 | A | * | 9/1996 | Iwatsuki et al. ............ 429/99 |
| 5,829,615 | A | * | 11/1998 | Rickinger et al. ......... 220/4.01 |
| 6,188,574 | B1 | * | 2/2001 | Anazawa ................... 361/695 |
| 6,227,322 | B1 | * | 5/2001 | Nishikawa ................ 180/68.5 |
| 6,382,457 | B1 | * | 5/2002 | Bernard et al. ............. 220/651 |
| 7,299,938 | B2 | * | 11/2007 | Loble et al. ................. 220/1.5 |
| 7,610,978 | B2 | * | 11/2009 | Takasaki et al. ........... 180/68.5 |
| 7,654,352 | B2 | * | 2/2010 | Takasaki et al. ........... 180/68.5 |
| 7,749,644 | B2 | * | 7/2010 | Nishino ...................... 429/100 |
| 7,771,865 | B2 | * | 8/2010 | Takasaki et al. ............. 429/83 |
| 7,824,797 | B2 | * | 11/2010 | Nishino et al. .............. 429/163 |
| 7,926,602 | B2 | * | 4/2011 | Takasaki .................... 180/68.5 |
| 7,931,105 | B2 | * | 4/2011 | Sato et al. .................. 180/68.5 |
| 8,012,620 | B2 | * | 9/2011 | Takasaki et al. ............. 429/100 |
| 8,079,435 | B2 | * | 12/2011 | Takasaki et al. ........... 180/68.5 |
| 8,210,301 | B2 | | 7/2012 | Hashimoto et al. |
| 8,535,395 | B2 | * | 9/2013 | Cai et al. .................... 29/623.1 |
| 2008/0160394 | A1 | * | 7/2008 | Takasaki et al. ............. 429/96 |
| 2008/0160396 | A1 | * | 7/2008 | Nishino ....................... 429/100 |
| 2008/0173488 | A1 | * | 7/2008 | Takasaki ..................... 180/68.5 |
| 2008/0173489 | A1 | * | 7/2008 | Takasaki ..................... 180/68.5 |
| 2008/0190679 | A1 | * | 8/2008 | Sato et al. ................... 180/68.5 |
| 2009/0145676 | A1 | | 6/2009 | Takasaki et al. |
| 2009/0152034 | A1 | * | 6/2009 | Takasaki et al. ............ 180/68.5 |
| 2009/0236162 | A1 | * | 9/2009 | Takasaki et al. ............ 180/68.5 |
| 2009/0242299 | A1 | * | 10/2009 | Takasaki et al. ............ 180/68.5 |
| 2010/0307848 | A1 | * | 12/2010 | Hashimoto et al. ......... 180/68.5 |
| 2011/0143179 | A1 | * | 6/2011 | Nakamori ..................... 429/99 |
| 2011/0297469 | A1 | | 12/2011 | Usami et al. |
| 2012/0103714 | A1 | * | 5/2012 | Choi et al. ................... 180/68.5 |
| 2012/0115000 | A1 | * | 5/2012 | Hashimura et al. .......... 429/100 |
| 2012/0183800 | A1 | * | 7/2012 | Chen et al. ................... 428/594 |
| 2012/0223113 | A1 | * | 9/2012 | Gaisne et al. ................ 224/538 |
| 2012/0251862 | A1 | * | 10/2012 | Kano et al. ..................... 429/99 |
| 2013/0118824 | A1 | * | 5/2013 | Maeda et al. ................ 180/68.5 |
| 2013/0229030 | A1 | * | 9/2013 | Yamaguchi et al. ..... 296/193.07 |

OTHER PUBLICATIONS

European Search Report issued Jun. 17, 2013 in the corresponding European Patent Application.

* cited by examiner

BATTERY CONTAINER

CROSS-REFERENCE TO RELATED APPLICATION(S)

This application is based upon and claims the benefit of priority from prior Japanese patent application No . 2012-017779, filed on Jan. 31, 2012, the entire contents of which are incorporated herein by reference.

BACKGROUND OF THE INVENTION

1. Field of the Invention

The present presently disclosed subject matter relates to a battery container which is to house a battery for driving a motor of an electric vehicle, and which allows the battery to be mounted on the vehicle body.

2. Description of the Related Art

An electric vehicle (including a so-called hybrid vehicle that is provided with an internal combustion engine) requires a large number of batteries for driving a motor. There is an example where such batteries are housed in a metal-made container (hereinafter, such a container is referred to as "battery container"), and the battery container housing the batteries is mounted on a vehicle by attaching the battery container to a frame of the vehicle (for example, refer to JP-A-2010-284984).

Such a battery container is required to exert a holding force by which the batteries are surely held in the container in order that the attachment is not loosened by vibrations occurring during running, a change in speed of the vehicle, or the like. Furthermore, the battery container is requested to have a robustness which prevents the container from being easily deformed even when the vehicle has an accident, and a protective function which, even when deformation reaches the container, minimizes breakage of the batteries.

Therefore, a battery container is requested to have a strength which can sufficiently cope with an impact accident. Materials of a battery container are a composite material in which a metal plate is used as a core member and a resin is adhered to the circumference thereof, a metal plate which is shaped by a press work, etc.

In order to improve the running performance of a vehicle or increase the battery mileage, however, a battery container is required to reduce its weight. When a battery container is formed by a thick metal plate in order to cope with a collision of a vehicle, the weight is excessively increased, and hence this countermeasure is not preferable. By contrast, when a battery container is formed so as to provide adequate strength in one direction of a vehicle, there is a possibility that sufficient strength and toughness cannot be formed in the other directions.

SUMMARY OF THE INVENTION

The presently disclosed subject matter may provide a battery container which is light in weight, and which has sufficient strength.

The battery container which is to house a battery for a vehicle and which is to be attached between at least two frames disposed in the vehicle, may comprise: a bottom plate; a wall member which is raised from a circumference of the bottom plate and which includes a side wall member disposed along the frames; an outer frame which is attached to an outer side of the side wall member; and an inner frame which is attached to an inner side of the side wall member, wherein the outer frame and the inner frame are extended in a substantially same direction along the side wall member, and the side wall member is clampingly held between the outer frame and the inner frame.

A closed cross-section structure may be formed by the outer frame and the inner frame.

The outer frame may include a first lower plate member which is joined to the bottom plate, and a first attaching member which is joined to the side wall member, and the inner frame may include a second lower plate member which is joined to the bottom plate, and a second attaching member which is joined to the side wall member.

The first attaching member of the outer frame and the second attaching member of the inner frame may be integrally joined together across the side wall member, and the first lower plate member of the outer frame and the second lower plate member of the inner frame may be integrally joined together across the side wall member.

A closed cross-section structure may be formed by the outer frame and the side wall member, and a closed cross-section structure may be formed by the inner frame and the side wall member.

The outer frame may include a first lower plate member which is joined to the bottom plate at a first position, and a first attaching member which is joined to the side wall member at a second position, and the inner frame may include a second lower plate member which is joined to the bottom plate at a third position, and a second attaching member which is joined to the side wall member at a fourth position.

At least one of a pair of the first position and the third position and a pair of the second position and the fourth position may be shifted from each other.

The inner frame may include a seat surface to which the battery is to be fixed by a fastening member.

A thickness of the outer frame may be larger than a thickness of the wall member.

A bracket which is to be attached to the at least two frames may be disposed outside the outer frame.

DETAILED DESCRIPTION OF THE INVENTION

Figure 1:
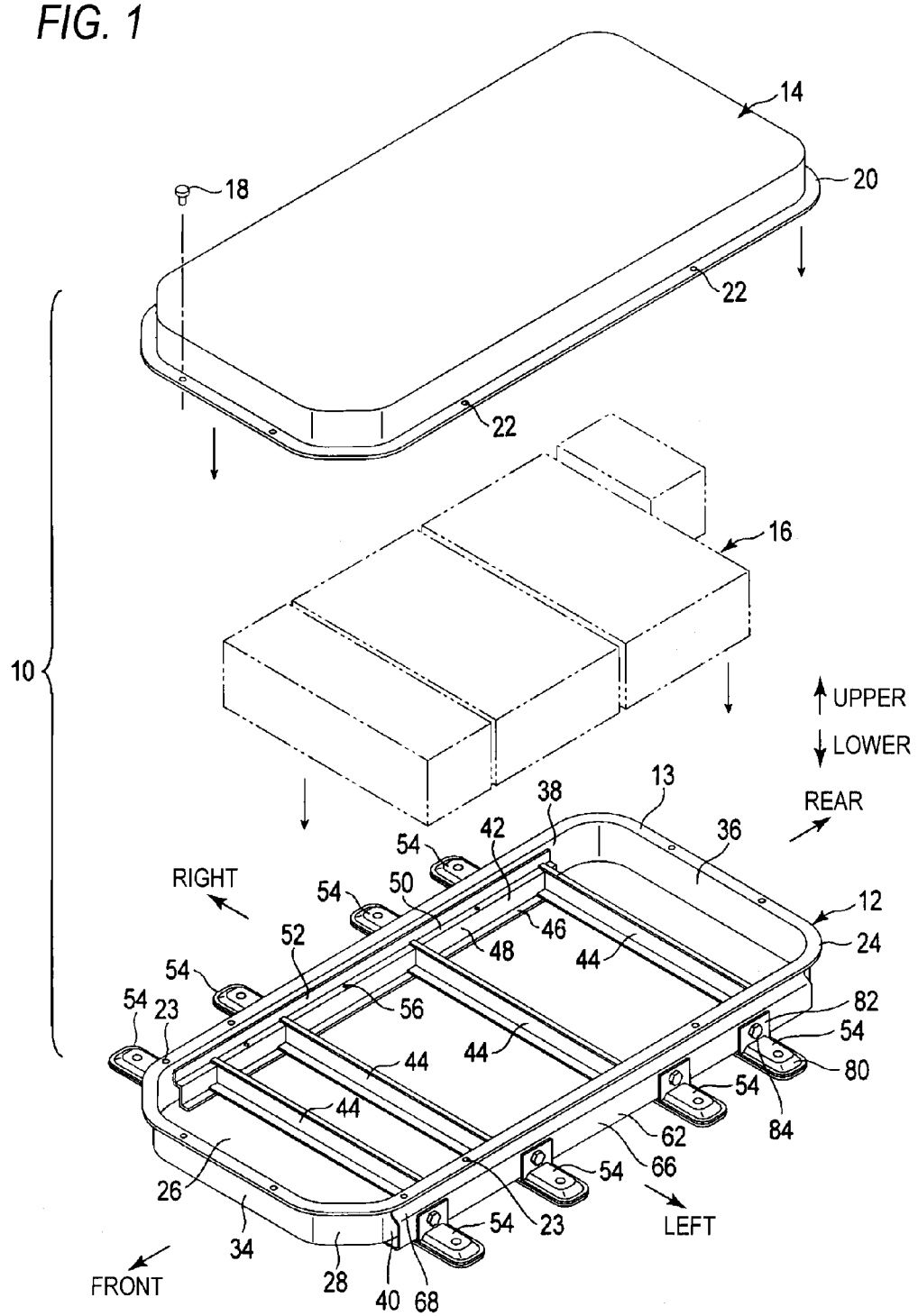
FIG. 1 is an exploded perspective view showing a battery container of a first embodiment of the presently disclosed subject matter.
Figure 3:
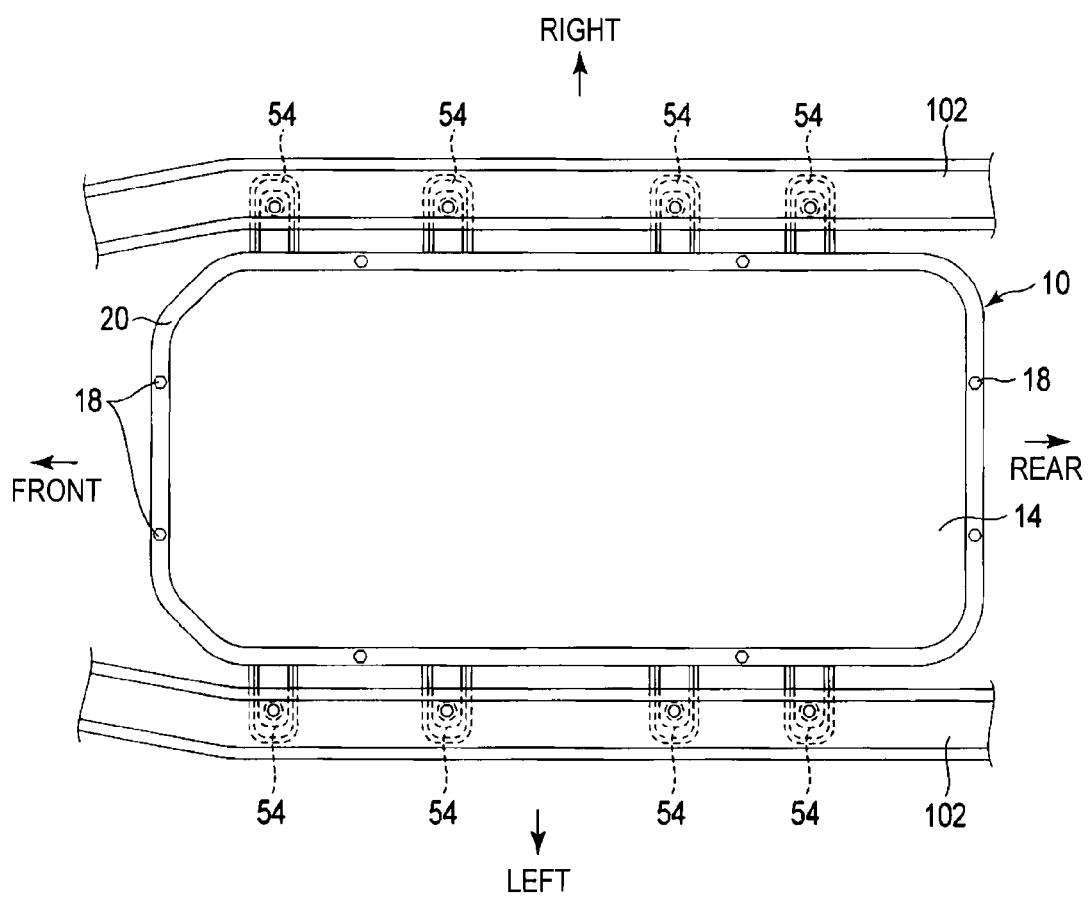
FIG. 3 is a plan view showing the battery container.
Figure 4:
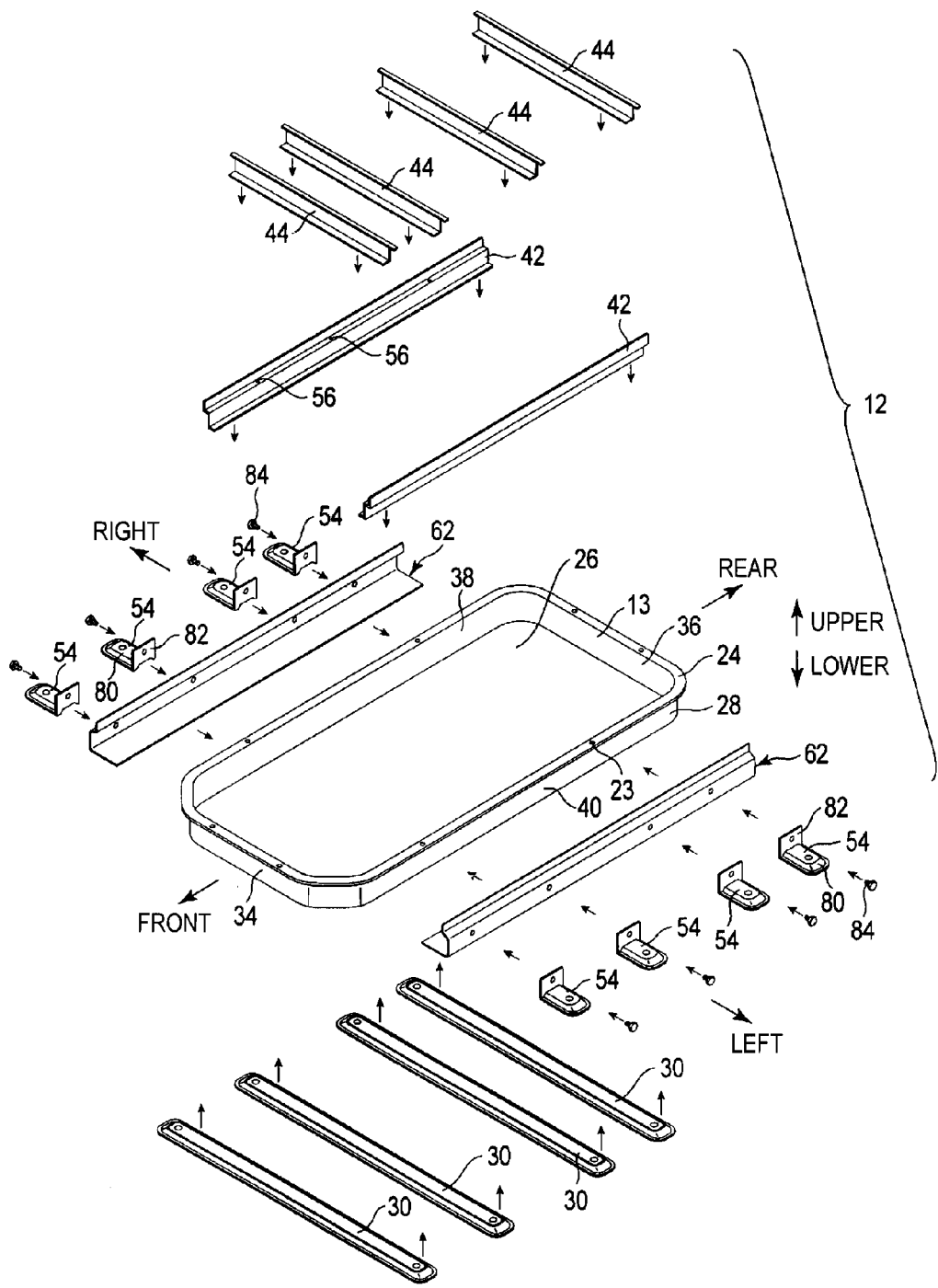
FIG. 4 is an exploded perspective view showing constituent members of the battery container.
Figure 5:
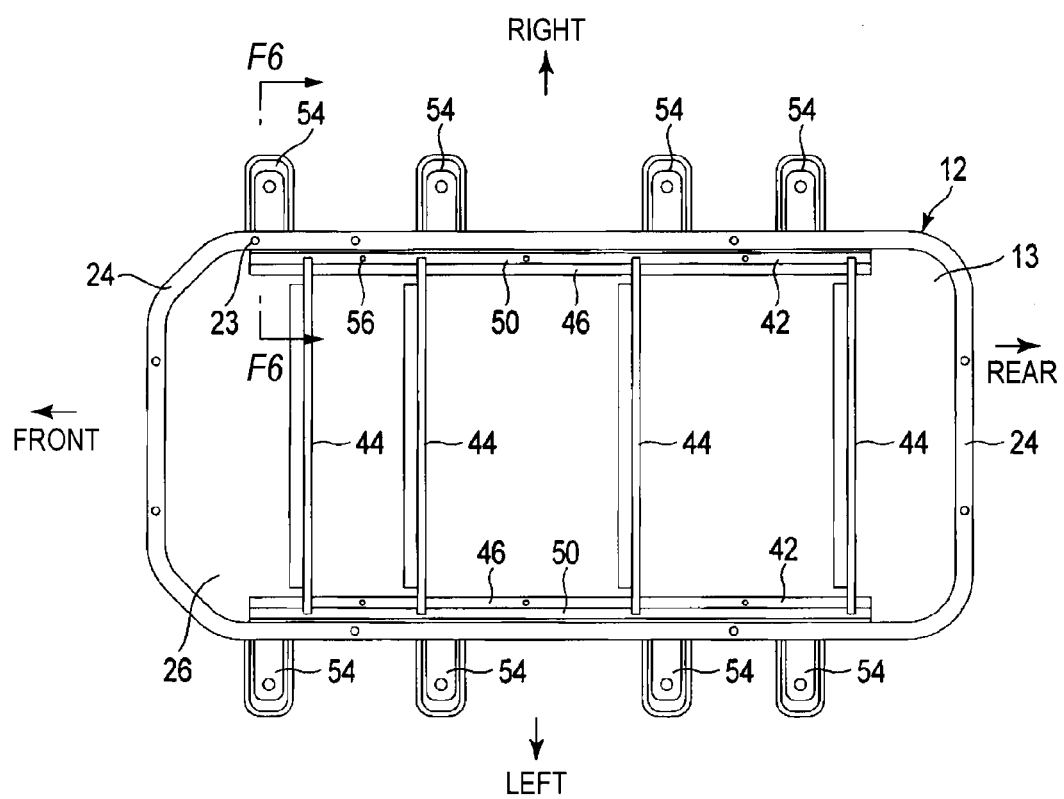
FIG. 5 is a plan view showing the container body of the battery container.
Figure 6:
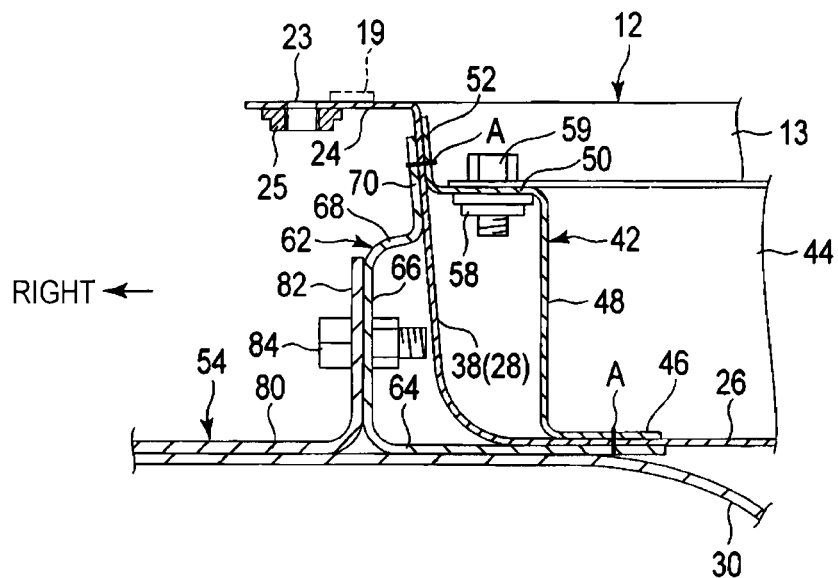
FIG. 6 is a sectional view showing the container body of the battery container, taken along line F6-F6 in FIG. 5.
Figure 7:
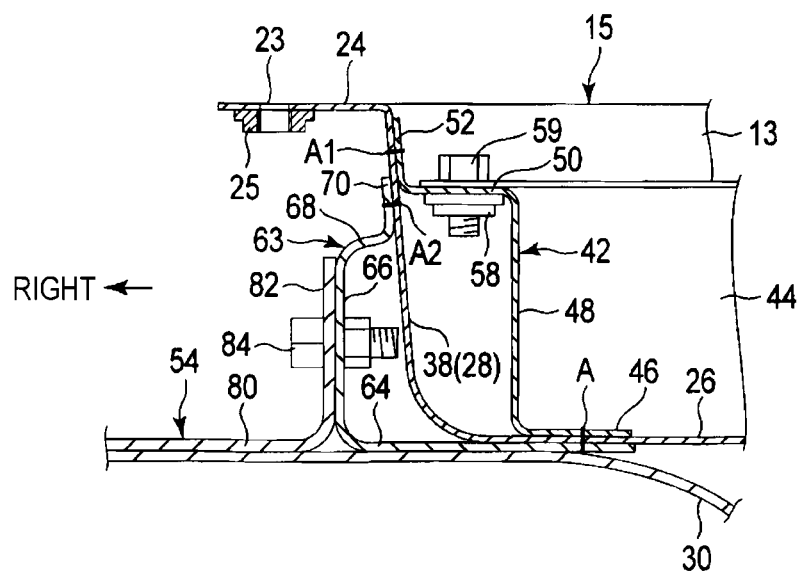
FIG. 7 is a sectional view showing the container body of a battery container of a second embodiment, cut along a plane passing through a bracket.
Figure 8:
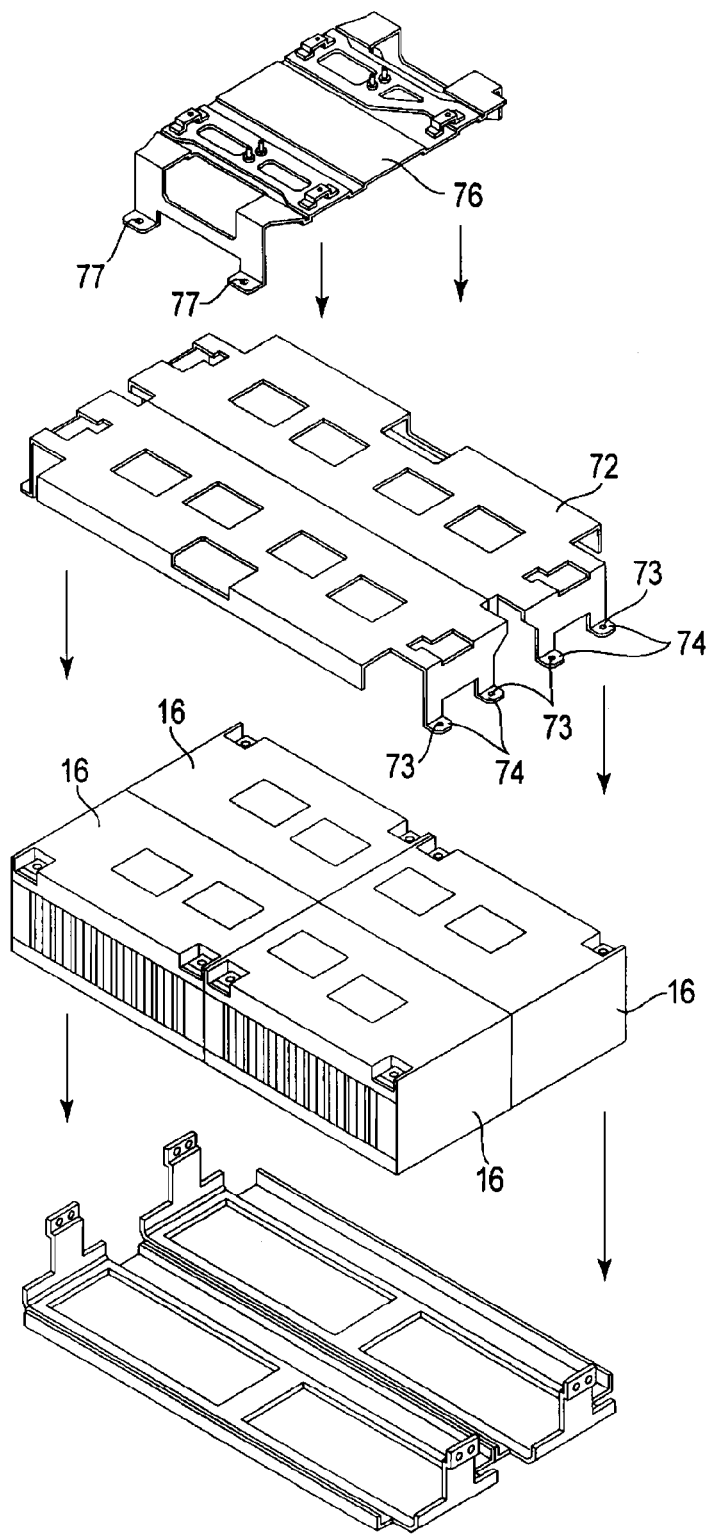
FIG. 8 is an exploded perspective view showing constituent members housed in the battery container of the first embodiment.
Figure 9:
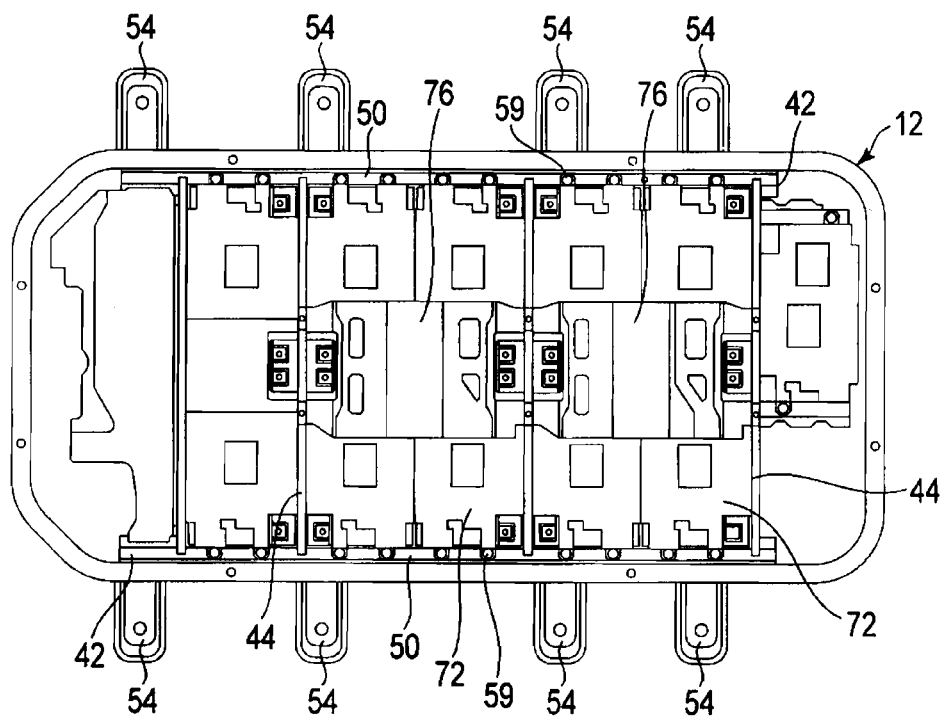
FIG. 9 is a plan view showing the battery container in which batteries are housed.

A battery container of a first embodiment of the presently disclosed subject matter will be described with reference to the drawings. FIG. 1 is an exploded perspective view showing a battery container 10, with opening a cover 14 from the container body 12, FIG. 2 is a perspective view showing the battery container 10 and a vehicle 100, FIG. 3 is a plan view showing a state where the battery container 10 is attached to side frames 102, FIG. 4 is an exploded perspective view showing the battery container 10 in an exploded manner, FIG. 5 is a plan view showing the container body 12 of the battery container 10, FIG. 6 is a sectional view showing a right side wall member 38 of the container body 12, taken along line F6-F6 in FIG. 5 passing through a bracket 54, FIG. 7 is a sectional view showing the container body 15 of a battery container of a second embodiment, cut along a plane passing through the bracket 54, FIG. 8 is an exploded perspective view showing constituent members housed in the battery container 10 of the first embodiment, and FIG. 9 is a plan view showing the battery container 10 in which batteries are housed.

Figure 2:
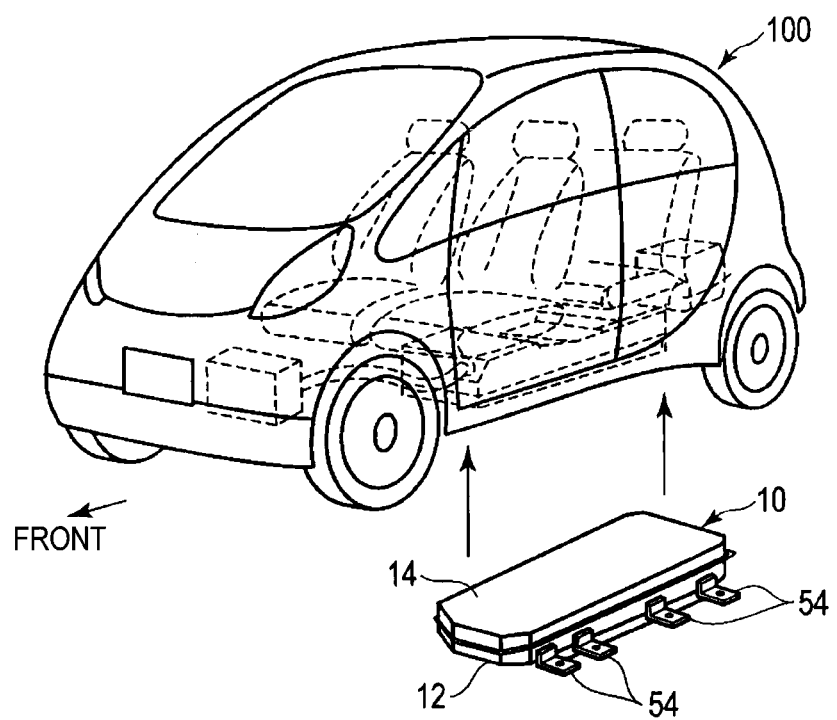
FIG. 2 is a perspective view showing a state where the battery container is attached to a vehicle.

As shown in FIG. 1, the battery container 10 includes the container body 12 and the cover 14, and, as shown in FIG. 2, is attached to the vehicle 100 from the lower side of the vehicle 100. Hereinafter, the description will be made on the following assumption. The front direction of the vehicle 100 shown in FIG. 2 is determined as the front direction of the battery container 10, and, with reference to the front direction, the rear, rightward, and leftward directions are determined. The direction of gravitational force is determined as the downward direction, and the direction opposite thereto is determined as the upward direction. Moreover, a direction which is directed from the circumference of the battery container 10 toward the center is determined as an inward direction, and a direction opposite thereto is determined as an outward direction.

As shown in FIG. 1, the battery container 10 includes the container body 12 and the cover 14. A plurality of battery modules 16 are housed in the battery container.

The cover 14 is molded from, for example, a fiber-reinforced synthetic resin material, and includes a rim portion 20 in the circumference. Bolt holes 22 are appropriately formed in the rim portion 20. Bolts 18 are passed through the bolt holes 22 to fasten the cover 14 to the container body 12. A gasket 19 (see FIG. 6) is disposed on the cover 14. The cover 14 is attached to the container body 12 by the bolts 18 via the gasket 19, thereby hermetically sealing the interior. An air suction/discharge mechanism for ventilating the interior of the battery container 10 may be disposed in the cover 14.

The battery modules 16 are assemblies each configured by of a plurality of cells, and constitute a battery for the vehicle 100. The plurality of battery modules 16 are housed in the battery container 10. After the battery container 10 houses the battery modules 16 in the interior, the container is attached to the vehicle 100 from the lower side of the vehicle 100 as shown in FIG. 2.

The vehicle 100 is an electric vehicle which includes a motor, and which is caused to run by driving the motor by an electric power supplied from the batteries. FIG. 3 shows a state where the battery container 10 is mounted on the vehicle 100. As shown in FIG. 3, the battery container 10 is attached to the side frames 102 which are extended in the anteroposterior direction in the right and left sides of the vehicle 100, via the brackets 54 and the like. The side frames 102 are members constituting the main frame of the vehicle 100.

FIG. 4 shows the container body 12 in an exploded manner. The container body 12 includes a tray body 13, inner and outer frames 42, 62 which function as reinforcement frames, partition plates 44, and the brackets 54. The tray body 13 includes a bottom plate 26, a wall member 28 which is raised from the circumference of the bottom plate 26, and a rim portion 24 which is formed in the periphery of the wall member 28. For example, the tray body 13 is integrally shaped by performing a press work on a metal plate.

Cross members 30 are attached to the rear surface of the bottom plate 26. The cross members 30 are attached by spot welding to four places of the bottom plate 26 at adequate intervals, respectively. The cross members 30 have a length by which their tip ends are caused to be appropriately projected from the right and left sides of the bottom plate 26.

The wall member 28 includes: a front wall member 34 which is disposed in the front side of the tray body 13; a rear wall member 36 which is disposed in the rear side; a right side wall member 38 which is disposed in the right side; and a left side wall member 40 which is disposed in the left side. In the front wall member 34, the both ends are rearward bent, and coupled to the right and left side wall members 38, 40, respectively. The rear wall member 36 is substantially linear, and smoothly coupled to the right and left side wall members 38, 40. The right and left side wall members 38, 40 are formed substantially linearly. Each of the right and left side wall members 38, 40 is a side wall member which is disposed along the corresponding side frame 102.

The front and rear wall members 34, 36, and the right and left side wall members 38, 40 are slightly inclined with respect to the bottom plate 26 in an outer direction as indicated by the right side wall member 38 in FIG. 6 so that their respective distances are increased in the upper side.

In the upper edge of the wall member 28, the rim portion 24 which is outward projected is disposed over the whole circumference of the wall member 28, correspondingly with the rim portion 20 of the cover 14. Bolt holes 23 are disposed in the rim portion 24 correspondingly with the bolt holes 22 of the rim portion 20. Nuts 25 are attached to the bolt holes 23, respectively.

FIG. 5 shows a plan view of the container body 12. The interior of the container body 12 includes a pair of inner frames 42, and four partition plates 44. The inner frames 42 have a length which is substantially equal to the whole lengths of the linear portions of the inner surfaces of the right and left side wall members 38, 40.

Next, the inner frames 42 will be described with taking the inner frame 42 attached to the right side wall member 38 as an example. FIG. 6 shows a partially sectional view of the container body 12, taken along line F6-F6 in FIG. 5. As shown in FIG. 6, the inner frames 42 includes: a lower plate member 46; a vertical piece member 48 which is raised from the lower plate member 46; an upper plate member 50 which is bent from the vertical piece member 48 in the direction opposite to the lower plate member 46; and an attaching member 52 which is raised from the upper plate member 50.

The lower plate member 46 is joined to the upper surface of the bottom plate 26 by spot welding conducted at a position A, together with a lower plate member 64 of the outer frame 62 which will be described later. Hereinafter, positions where spot welding is conducted are indicated by A, or A1, A2, etc.

The vertical piece member 48 is bent substantially perpendicularly with respect to the lower plate member 46, and raised substantially vertically from the bottom plate 26.

The upper plate member 50 is bent substantially perpendicularly from the vertical piece member 48, and disposed in substantially parallel to the bottom plate 26. Bolt holes 56 are formed in the upper plate member 50, and nuts 58 are fixed to the rear surface correspondingly with the bolt holes 56. The attaching member 52 is integrally joined to the right side wall member 38 by spot welding conducted at the position A, together with an attaching member 70 of the outer frame 62 which will be described later.

When the inner frame 42 is attached to the right side wall member 38, a closed cross-section structure having a hollow portion is formed inside the right side wall member 38 by the vertical piece member 48, the upper plate member 50, the right side wall member 38, and the bottom plate 26. Similarly with the right side wall member 38, the other inner frame 42 is attached to the left side wall member 40. The left side wall member 40 is configured in a similar manner as the right side wall member 38, and therefore its description is omitted.

The partition plates 44 are disposed between the right and left inner frames 42. The partition plates 44 are attached to adequate positions of the inner frames 42 by bolts 59 which are passed through the bolt holes 56. The partition plates 44 are attached correspondingly with the battery modules 16. The plurality of battery modules 16 are housed without any space inside portions partitioned by the partition plates 44.

As shown in FIGS. 8 and 9, the battery modules 16 are held while being covered by a holder member 72. The holder member 72 has flange portions 74 in each of which a bolt hole 73 is formed. In the above-described upper plate member 50, the bolt holes 56 in which the nuts 58 are fixed to the rear surface side are formed also at positions corresponding to the bolt holes 73 of the flange portions 74.

The bolts 59 are passed through the bolt holes 56 and the bolt holes 73 of the flange portions 74, to fasten the holder member 72 to the upper plate member 50, whereby the battery modules 16 are fixed to the tray body 13. The nuts 58 and the bolts 59 are an example of the fastening members in the presently disclosed subject matter, and the upper plate member 50 constitutes a seating surface to which the battery modules 16 are fixed by the fastening members.

Since the fixation of the battery modules 16 is performed via the holder member 72, the battery modules 16 can be stably held. As shown in FIG. 9, moreover, holder members 76 which hold the battery modules 16 are attached to the outer surface of the holder member 72, whereby the force of holding the battery modules 16 is further enhanced.

In each of the holder members 76, a plurality of bolt holes 77 are formed at positions corresponding to the partition plates 44. In the upper ends of the partition plates 44, bolt holes in each of which a nut is fixed to the rear surface side are formed at positions corresponding to the bolt holes 77 of the holder members 76. Bolts are passed through the bolt holes 77 of the holder members 76 to fasten the holder members 76 to the upper ends of the partition plates 44. According to the configuration, the battery modules 16 are further stably held.

As shown in FIGS. 4 and 6, the container body 12 further includes a pair of outer frames 62 on the outer sides. Next, the outer frames 62 will be described with taking the outer frame 62 attached to the right side wall member 38 as an example. As shown in FIG. 4, the outer frames 62 have a length which is substantially equal to the whole length of the linear portion of the outer side of each of the right and left side wall members 38, 40.

As shown in FIG. 6, the outer frame 62 includes: the lower plate member 64; a vertical piece member 66 which is raised from the lower plate member 64; an upper plate member 68 which is bent from the vertical piece member 66 in the same direction as the lower plate member 64; and the attaching member 70 which is raised from the upper plate member 68.

In order to enhance the strength, the outer frame 62 is formed by a plate member which is thicker than the members forming the tray body 13. Alternatively, the outer frame 62 may be formed by a higher strength material to enhance the strength, instead of increasing the thickness. The strength of the inner frames 42 may be enhanced in a similar manner.

The lower plate member 64 of the outer frame 62 is joined to the lower surface of the bottom plate 26 by spot welding conducted at a position A, together with the lower plate member 46 of the inner frame 42. The vertical piece member 66 is bent substantially perpendicularly with respect to the lower plate member 64 to be raised from the lower plate member 64 approximately vertically. When the cover 14 is attached, the vertical piece member 66 is positioned more inward than the position of the gasket 19 which is in contact with the upper side of the rim portion 24 to hermetically seal the interior of the battery container 10. The upper plate member 68 is bent in the same direction as the lower plate member 64. The attaching member 70 is joined to the outer surface of the right side wall member 38 by spot welding conducted at the position A, together with the attaching member 52.

When the outer frame 62 is attached to the right side wall member 38, a closed cross-section structure having a hollow portion is formed outside the right side wall member 38 by the lower plate member 64, the vertical piece member 66, the upper plate member 68, the attaching member 70, the right side wall member 38, and the bottom plate 26. Similarly with the right side wall member 38, the other outer frame 62 is attached to the left side wall member 40. The left side wall member 40 is configured in a similar manner as the right side wall member 38, and therefore its description is omitted.

Moreover, the brackets 54 are attached to the outer sides of the outer frames 62. Four brackets 54 are disposed for each of the right and left outer frames 62, or namely eight brackets in total are disposed. Each of the brackets 54 has a bracket basal portion 80, and a rising portion 82 which is bent in an L-like shape from the bracket basal portion 80. The rising portion 82 is fastened by a bolt 84 to the vertical piece member 66 of the corresponding outer frame 62. The bracket basal portion 80 is overlaid on the corresponding cross member 30, and attached together with the cross member 30 to the corresponding side frame 102.

Next, functions and effects of the battery container 10 of the first embodiment will be described. In the battery container 10, the battery modules 16 are housed in regions partitioned by the partition plates 44, respectively. The terminals of the battery modules 16 are connected by connecting wires. The holder member 72 presses the battery modules 16 from the upper side to fix the battery modules 16 to the container body 12. After fixing the battery modules 16, the cover 14 is attached to the container body 12 by the bolts 18 via the gasket 19, thereby hermetically sealing the interior of the battery container 10.

As shown in FIG. 3, the battery container 10 is screw-fixed together with the cross members 30 via the brackets 54 to the side frames 102. Power supply wires elongating from the battery modules 16 are connected to a driving mechanism of the vehicle 100, and the like. Therefore, the battery modules 16 are housed in the battery container 10 without any space therebetween and in a closely arranged manner, and then mounted on the vehicle 100.

The battery container 10 is fixed to the side frames 102 via the brackets 54 attached to the outer frames 62, and therefore firmly fixed to the vehicle 100. The battery modules 16 are housed in the battery container 10 in a state where the modules are pressed in the right and left sides by the vertical piece members 48 of the inner frames 42, and the partition plates 44 for separating the battery modules 16 are fixed by the bolts 59 which are passed through the bolt holes 56 of the inner frames 42. Even when vibrations during running or the like are applied to the battery container, therefore, troubles such as positional displacement do not occur, and the battery modules are surely held.

The upper plate members 50 of the inner frames 42 constitute seating surfaces to which the battery modules 16 are fixed by the fastening members. In this way, the inner frames 42 which have a function of a reinforcement frame are provided also with a function of fixing the battery modules 16. Therefore, a more efficient design of a battery container is enabled.

If another vehicle collides with the vehicle 100 from the right lateral side, for example, the right side wall member 38 of the battery container 10 is firmly held, and strongly copes with an external force which is applied in the collision, because the inner and outer frames 42, 62 are attached to the right side wall member 38 so as to be extended in a substantially same direction along the right side wall member 38 to clampingly hold the right side wall member 38.

The closed cross-section structure is formed by the inner and outer frames 42, 62, and therefore the right side wall member 38 is not easily bent by such an external force. Even when a force which is so large that the right side wall member 38 is deformed is applied to the right side wall member 38, the hollow inner and outer frames 42, 62 forming a closed cross-section structure are deformed to absorb the collision energy. Therefore, the damage of the battery modules 16 can be reduced.

The inner and outer frames 42, 62 are formed by a material which is higher in strength than that of the tray body 13.

Therefore, predetermined strength can be attained in the lateral direction, and the weight of the battery container 10 can be reduced.

The configuration where the battery container 10 is attached between the side frames 102 is employed. Since wheels, a driving mechanism, and the like are disposed in the front and rear sides of the vehicle 100, relatively large spaces are formed in front and behind of the battery container 10. However, large spaces which can absorb an external force are not formed on the right and left sides of the battery container 10. In the case where the presently disclosed subject matter is applied, even when the battery container 10 is not formed by a thick metal plate, therefore, it is possible to ensure strength which can sufficiently cope with a lateral side impact accident such as a collision against a lateral side of the vehicle or that against a power pole from a lateral side.

Next, the container body 15 of a battery container of a second embodiment will be described. The components of the container body 15 which are identical with those of the container body 12 are denoted by the same reference numerals, and their description is omitted.

In the container body 15, as shown in FIG. 7, the position A of spot welding between the inner frames 42 and the right side wall member 38 of an outer frame 63 is different from that of the battery container 10. In the battery container 10, the inner and outer frames 42, 62 are integrally joined by spot welding while interposing the right side wall member 38 therebetween. In the container body 15, the inner frames 42 and the right side wall member 38 are spot-welded at a position indicated by A1, and the outer frame 63 and the right side wall member 38 are spot-welded at a position indicated by A2.

In the first embodiment, the configuration where the closed cross-section structure is formed by the inner and outer frames 42, 62 has been described. In the embodiment, by contrast, the joining places between the right side wall member 38 and the inner and outer frames 42, 63 are shifted from each other, and therefore a closed cross-section structure is not formed by the inner and outer frames 42, 63. However, the embodiment is configured so that closed cross-section structures are formed by the outer frame 63 and the right side wall member 38, and the inner frame 42 and the right side wall member 38, respectively.

In the presently disclosed subject matter, the container body 15 of the battery container may be formed in this way. In FIG. 7, the joining places between the right side wall member 38 and the inner and outer frames 42, 63 are shifted from each other. Alternatively, the joining places between the bottom plate 26 and the inner and outer frames 42, 63 may be shifted from each other, and joining may be performed while both of the joining places between the right side wall member 38 and the inner and outer frames 42, 63 and the joining places between the bottom plate 26 and the inner and outer frames 42, 63 are shifted. The joining method is not limited to spot welding, and another joining method may be employed.

When the first and second embodiments are compared with each other, the configuration which is shown in the first embodiment, and in which the closed cross-section structure is formed by the inner and outer frames 42, 62 can form the larger hollow closed cross-section structure, and hence can absorb collision energy more efficiently. Therefore, the first embodiment is preferred.

Although the presently disclosed subject matter has been described by means of the first and second embodiments, the presently disclosed subject matter is not limited to the embodiments. Various modifications may be made without departing from the spirit of the presently disclosed subject matter. For example, the embodiments have the configuration where the battery container 10 is attached to the side frames 102. The presently disclosed subject matter is not limited to this configuration, and the battery container may be attached between at least two cross frames which are extended in the lateral direction of the vehicle.

The presently disclosed subject matter may have a configuration where the partition plates 44 and the holder members 72, 76 are omitted. In the embodiments, the bolts 59 are passed through the bolt holes 73 formed in the flange portions 74 of the holder member 72, and the holder member 72 is fastened to the upper plate members 50 of the inner frames 42, whereby the fixation of the battery modules 16 is performed via the holder member 72. The presently disclosed subject matter is not limited to this. Flange portions (not shown) may be disposed in the battery modules 16, bolt holes may be formed in the flange portions, bolts may be passed through the bolt holes, and the battery modules 16 may be directly fastened to the upper plate members 50 of the inner frames 42.

The configuration where the upper plate members 50 of the inner frames 42 are used as seating surfaces for fixing the battery modules 16 may not be employed. In this case, the upper ends of the partition plates 44, those of other plate members (not shown) disposed in the battery container 10, or the like may be adequately set as seating surfaces to which the battery modules 16 are to be fixed.

According to an aspect of the presently disclosed subject matter, the side wall members of the battery container are strengthened by the outer and inner frames, and, even when vibrations or the like are applied, the battery container can surely hold batteries housed therein. Moreover, the outer and inner frames are extended in the substantially same direction along the side wall members to clampingly hold the side wall members, and therefore the strength of the side wall members is enhanced. Even when an external force is applied to the vehicle, the battery container is prevented from being easily damaged.

The presently disclosed subject matter can be applied to a battery container which houses a battery for an electric vehicle.

What is claimed is:

1. A battery container which is to house a battery for a vehicle and which is to be attached between at least two frames disposed in the vehicle, the battery container comprising:
   a bottom plate;
   a wall member which is raised from a circumference of the bottom plate and which includes a side wall member disposed along the frames;
   an outer frame which is attached to an outer side of the side wall member; and
   an inner frame which is attached to an inner side of the side wall member, wherein
   the outer frame and the inner frame are extended in a substantially same direction along the side wall member, and
   the side wall member is clampingly held between the outer frame and the inner frame,
   wherein the inner frame includes an upper plate member that extends in a horizontal direction from the side wall member, a vertical piece member that extends in a vertical direction from one end of the upper plate member to the bottom plate, such that a first hollow portion is defined by the upper plate member, the vertical piece member, the side wall member, and the bottom plate, wherein
   wherein the outer frame and the side wall member define a second hollow portion,
   wherein the outer frame includes a first lower plate member which is joined to the bottom plate, and a first attaching member which is joined to the side wall member, and
   the inner frame includes a second lower plate member that extends from a lower end of the vertical piece member and joined to the bottom plate, and a second attaching member that extends from an opposite end of the upper plate member and joined to the side wall member, and
   wherein the first attaching member of the outer frame and the second attaching member of the inner frame are integrally joined together across the side wall member,
   the first lower plate member of the outer frame and the second lower plate member of the inner frame are integrally joined together across the side wall member, and
   wherein a first closed cross-section structure defining a second hollow portion is formed by the outer frame and the side wall member, and
   a second closed cross-section structure defining the first hollow portion is formed by the inner frame and the side wall member.

2. The battery container according to claim 1, wherein
   the first lower plate member is joined to the bottom plate at a first position, and the first attaching member is joined to the side wall member at a second position, and
   the second lower plate member is joined to the bottom plate at a third position, and a second attaching member is joined to the side wall member at a fourth position.

3. The battery container according to claim 2, wherein
   at least one of a pair of the first position and the third position and a pair of the second position and the fourth position is shifted from each other.

4. The battery container according to claim 1, wherein the upper plate member forms a seat surface to which the battery is to be fixed by a fastening member.

5. The battery container according to claim 1, wherein a thickness of the outer frame is larger than a thickness of the wall member.

6. The battery container according to claim 1, further comprising:
   a bracket which is disposed outside the outer frame and to be attached to one of the at least two frames.

* * * * *